United States Patent
Wake et al.

(10) Patent No.: US 8,247,121 B2
(45) Date of Patent: Aug. 21, 2012

(54) FUEL CELL SYSTEM WITH PURGING AND METHOD OF OPERATING THE SAME

(75) Inventors: Chihiro Wake, Saitama (JP); Minoru Uoshima, Saitama (JP); Yuichiro Kosaka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1173 days.

(21) Appl. No.: 11/654,283

(22) Filed: Jan. 16, 2007

(65) Prior Publication Data
US 2008/0044691 A1 Feb. 21, 2008

(30) Foreign Application Priority Data
Jan. 17, 2006 (JP) .................................. 2006-008953

(51) Int. Cl.
*H01M 8/04* (2006.01)
*H01M 2/14* (2006.01)
(52) U.S. Cl. .......................... 429/429; 429/444; 429/513
(58) Field of Classification Search ........... 429/400–535
See application file for complete search history.

(56) References Cited

U.S. PATENT DOCUMENTS

| | | | | |
|---|---|---|---|---|
| 5,648,182 A | * | 7/1997 | Hara et al. | 429/412 |
| 2004/0137292 A1 | * | 7/2004 | Takebe et al. | 429/23 |
| 2005/0074641 A1 | * | 4/2005 | Inai et al. | 429/13 |
| 2005/0164046 A1 | * | 7/2005 | Fujihara et al. | 429/12 |
| 2005/0271918 A1 | | 12/2005 | Murakami et al. | |

FOREIGN PATENT DOCUMENTS

| | | |
|---|---|---|
| JP | 2003-331893 | 11/2003 |
| JP | 2004-179034 | 6/2004 |
| JP | 2005-141943 | 6/2005 |
| JP | 2005-302515 A1 | 10/2005 |
| JP | 2006-4904 | 1/2006 |
| WO | 2005/043663 A1 | 5/2005 |

OTHER PUBLICATIONS

Japanese Office Action for Application No. 2006-008953, dated Aug. 31, 2010.

* cited by examiner

*Primary Examiner* — Barbara Gilliam
*Assistant Examiner* — Stephan Essex
(74) *Attorney, Agent, or Firm* — Nelson Mullins Riley & Scarborough LLP; Anthony A. Laurentano

(57) ABSTRACT

Upon stop of electric power generation of a fuel cell a hydrogen shutoff valve is closed, and a cathode is purged. At the same time, an air introducing valve and the purge valve are opened. The air taken in by the compressor is introduced into the anode through the air introducing tube to exhaust the hydrogen remaining in the anode to replace the hydrogen with the air. When the replacement of the hydrogen with the air has been finished, the compressor is turned off and the air introducing valve and the purge valve are opened. After that, if a temperature of the fuel cell is determined to be equal to or lower than a threshold "a", a cathode-prioritized purge and an anode-prioritized purging are performed.

9 Claims, 9 Drawing Sheets

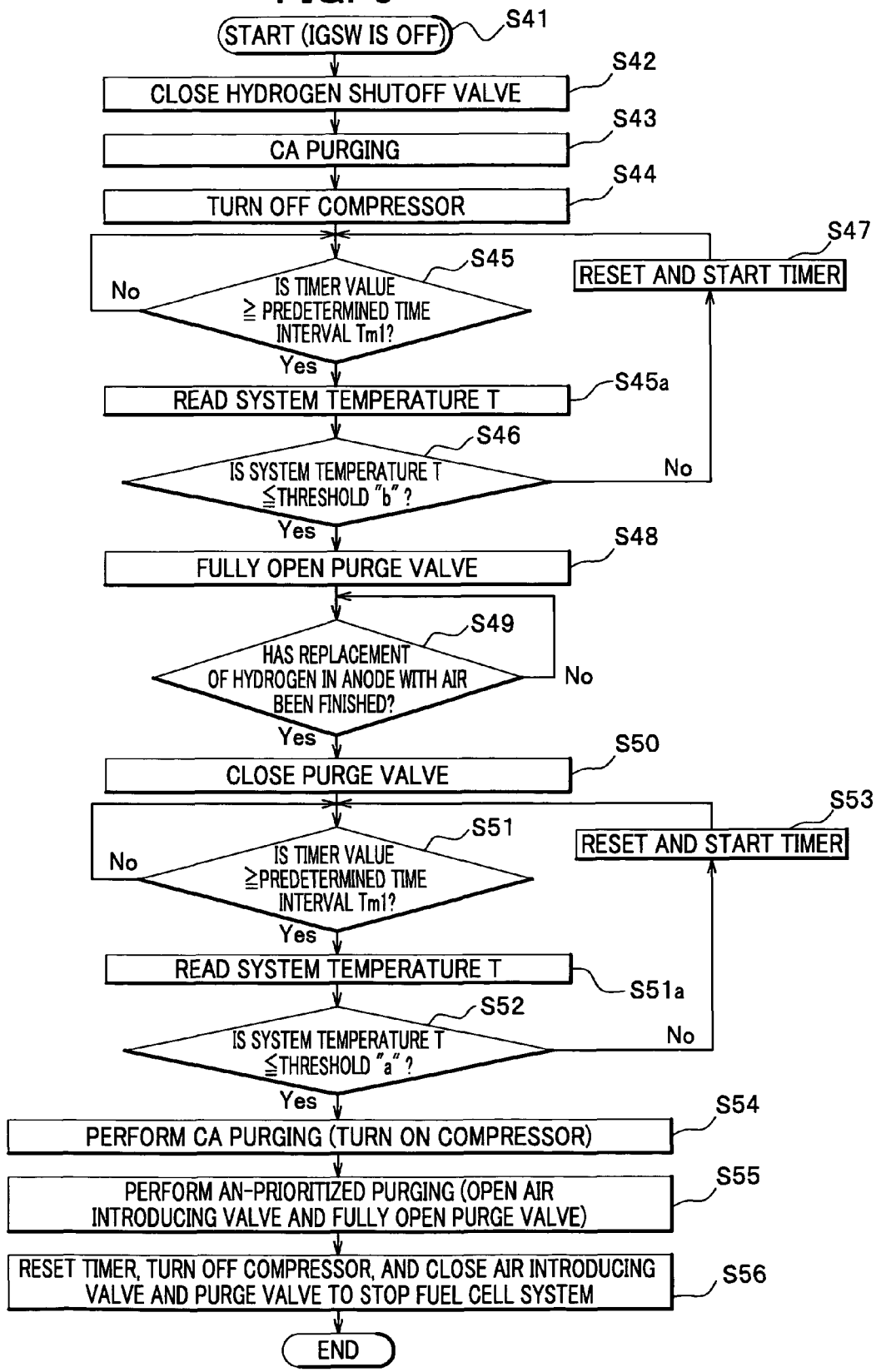

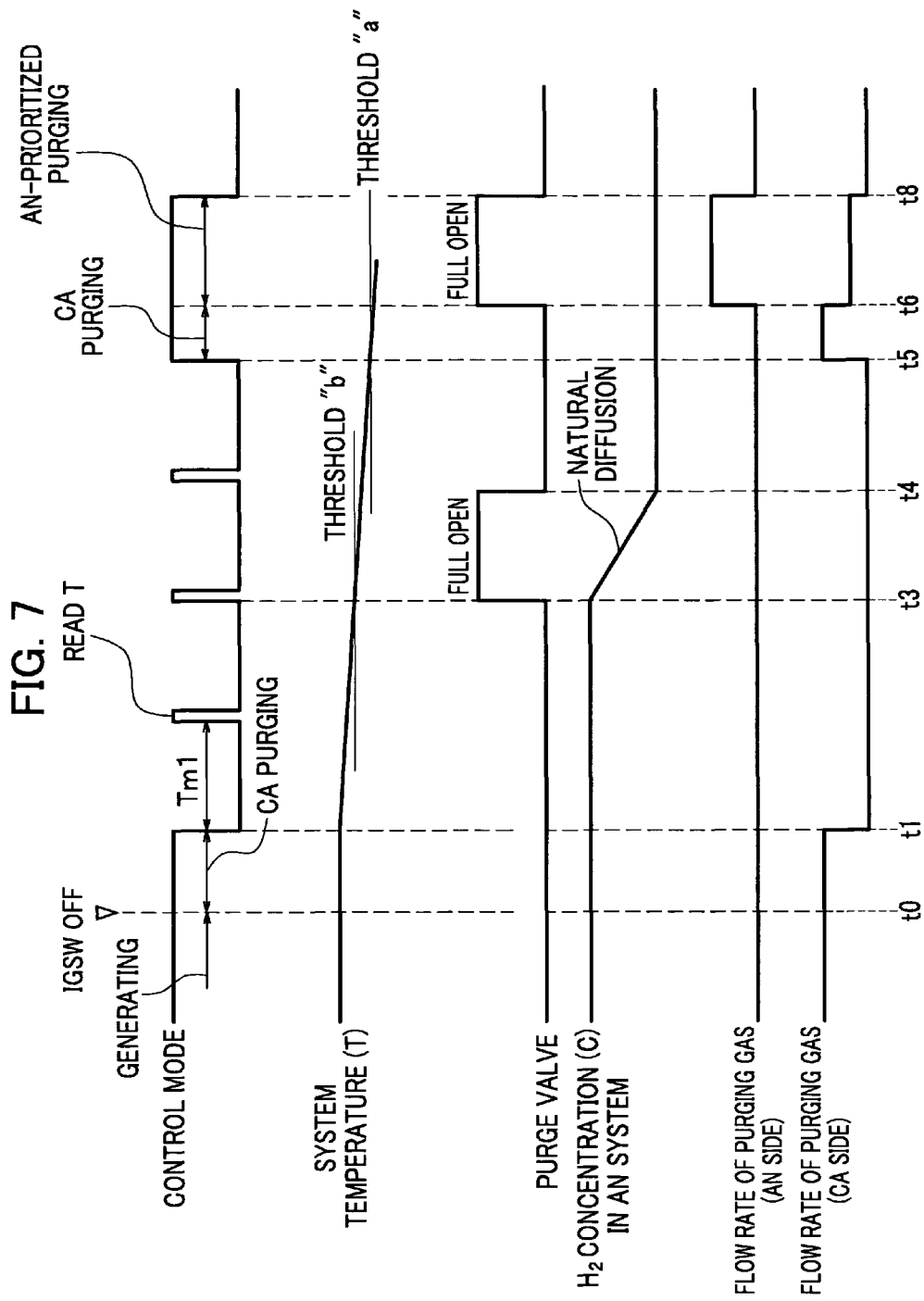

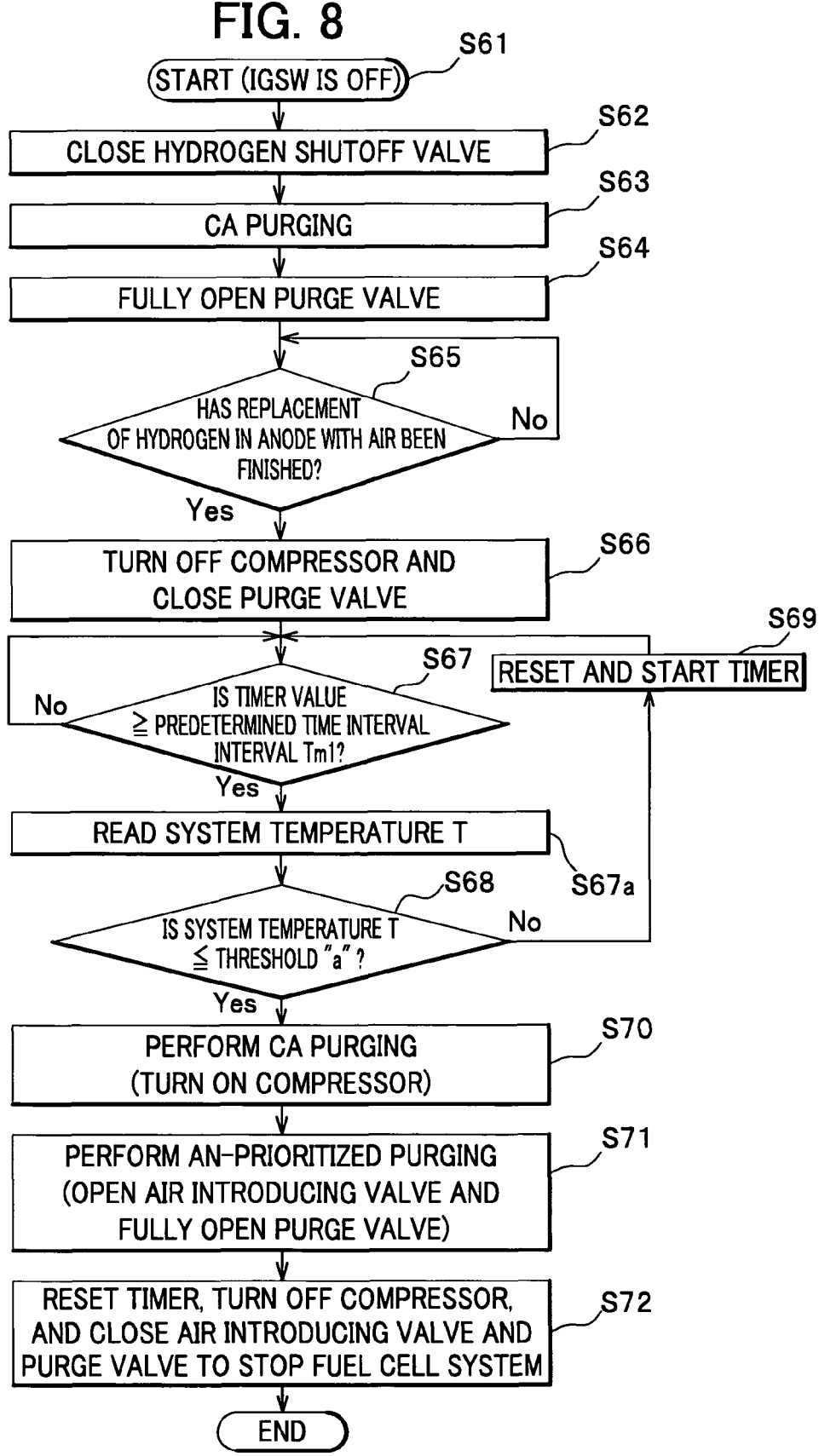

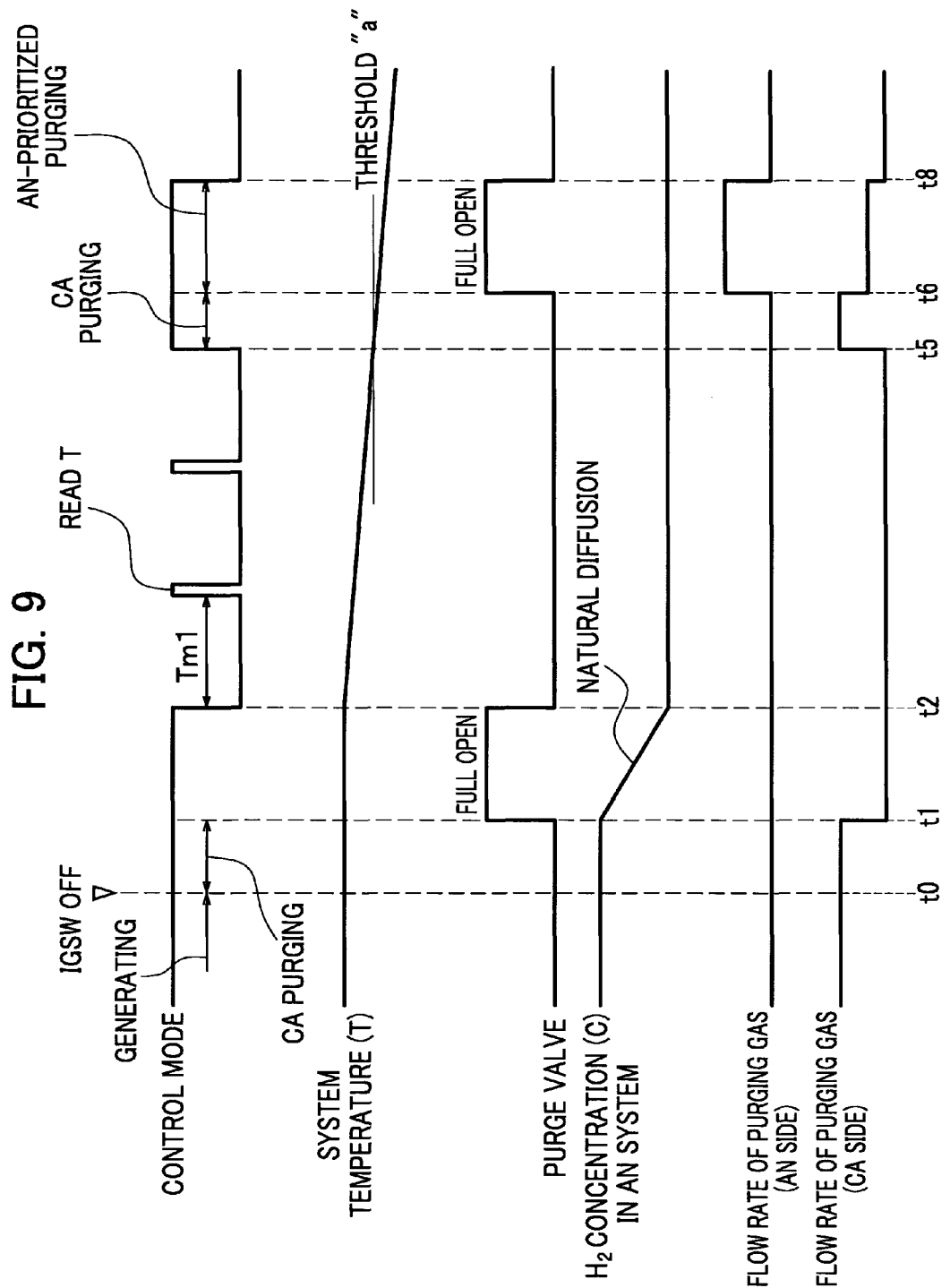

FUEL CELL SYSTEM WITH PURGING AND METHOD OF OPERATING THE SAME

CROSS REFERENCE TO RELATED APPLICATIONS

This application claims the benefit of Japanese Patent Application No. 2006-008953 filed on Jan. 17, 2006, the disclosure of which is incorporated herein by reference.

FIELD OF THE INVENTION

The present invention relates to a fuel cell system and a method of operating the same and particularly to a fuel cell system and a method of operating the same with purging a reaction gas when power generation is stopped.

DESCRIPTION OF THE RELATED ART

Fuel cell systems used in vehicles include a plurality of single cells stacked, each cell being configured by sandwiching a solid polymer electrolyte membrane between an anode and a cathode, in which hydrogen is supplied from a hydrogen tank to the anode as fuel, and air is supplied to the cathode to generate an electric power by an electrochemical reaction with generation of water at the cathode. When the vehicle is used under such a low temperature state that a temperature decreases below zero, in which remaining water may freeze, a process of exhausting the remaining water with a purging gas (cathode purging) is performed. In addition, because the remaining water may permeate the solid polymer electrolyte membrane from the cathode to the anode, a process of exhausting remaining water in the anode with a purging gas is performed (anode purging). U.S. Patent Application Publication No. 2005/0271918, filed Apr. 18, 2005, which is incorporated herein by reference, an anode side is purged when a temperature of the fuel cell is not greater than a predetermined temperature (for example, 0° C.) after stopping the power generation in the fuel cell (see FIG. 2 in U.S. Patent Application Publication No. 2005/0271918).

SUMMARY OF THE INVENTION

A first aspect of the present invention provides a fuel cell system comprising: a fuel cell including an anode supplied with a fuel gas and a cathode supplied with an oxidizing gas for generating an electric power; a fuel gas flow passage including the anode for allowing the fuel gas to flow therethrough; an oxidizing gas flow passage including the cathode for allowing the oxidizing gas to flow therethrough; a fuel gas flow passage purging part that purges the fuel gas flow passage with a purging gas when a state of the fuel cell satisfies a first predetermined condition when the electric power is not generated; and a fuel gas discharging part that stops supply of the fuel gas to the fuel gas flow passage and discharges the fuel gas from the fuel gas flow passage, when the electric power is not generated, before the fuel gas flow passage purging part purges the fuel gas flow passage.

The fuel cell system according to the first aspect may shorten a time interval for which single cells in the fuel cell are placed in a high voltage state by exhausting the fuel gas remaining in the anode before purging the anode to improve a durability of the fuel cell.

A second aspect of the present invention based on the first aspect provides a fuel cell system further comprising: an oxidizing gas flow passage purging part that purges the oxidizing gas flow passage with the oxidizing gas when the electric power is not generated, wherein the oxidizing gas flow passage purging part purges the oxidizing gas flow passage as well as the fuel gas purging part exhausts the fuel gas having a predetermined quantity of the purging gas in the fuel gas flow passage by allowing the purging gas to flow into the fuel gas flow passage, before the fuel gas purging part purges the fuel gas in the fuel gas flow passage; and a combining flow passage for combining a flow of the fuel gas exhausted from the fuel gas flow passage with a flow of gas purged from the oxidizing gas flow passage.

The fuel cell system according to the second aspect may shorten a time interval for which the fuel gas in the anode is exhausted and reduce the concentration of the fuel gas by introducing a predetermined (small) amount of the purging gas into the anode to push out the fuel gas from the fuel gas flow passage and combining the pushed out fuel gas and the off-gas of the cathode, while the oxidizing gas flow passage is purged.

A third aspect of the present invention based on the first aspect provides a fuel cell system, wherein the fuel gas flow passage purging part comprises a valve through which the fuel gas flow passage is communicated with an outside air, the fuel gas flow passage purging part opening the valve to exhaust the fuel gas.

The fuel cell system according to the third aspect may provide a simple structure and reduce additional energy consumption by opening the purge valve in the fuel gas flow passage to exhaust the fuel gas by natural diffusion.

A fourth aspect of the present invention based on the first aspect provides a fuel cell system, wherein the fuel gas purging part purges the fuel gas in the fuel gas flow passage having a predetermined quantity of the purging gas immediately after the generation of the electric power is stopped.

The fuel cell system according to the fourth aspect may shorten a time interval for which single cells in the fuel cell are placed in a high voltage state by exhausting the fuel gas remaining in the anode just after stop of the power generation of the fuel cell to improve a durability of the fuel cell.

A fifth aspect of the present invention based on the first aspect provides a fuel cell system, wherein the fuel gas exhausting part exhausts the fuel gas in the fuel gas flow passage with the purging gas when the state of the fuel cell satisfies a second predetermined condition providing an earlier timing than the first predetermined condition.

The fuel cell system according to the fifth aspect may exhaust the fuel gas, only when occasion demands, by exhausting the fuel gas when a condition which can be established before another condition for purging the fuel gas flow passage is satisfied. For example, in a case that a startup of the fuel cell is required just after the stop of the power generation, this structure can start up again the power generation rapidly because the fuel gas remains in the fuel gas flow passage because the exhausting the fuel gas is not performed just after the stop of the power generation. Thus, the exhausting the fuel gas is suspended until a predetermined condition (time, temperature) is satisfied.

A sixth aspect of the present invention based on the first aspect provides a fuel cell system, wherein the state of the fuel cell is a temperature of the fuel cell.

The fuel cell system according to the sixth aspect may provide an accurate timing necessary for purging by determining the predetermined condition in accordance with a temperature of the fuel cell, i.e., timing when the number of drops of dew water increases due to decrease in the temperature to some extent.

A seventh aspect of the present invention provides a method of operating a fuel cell system including: a fuel cell including an anode supplied with a fuel gas and a cathode supplied with an oxidizing gas for generating an electric power; a fuel gas flow passage including the anode for allowing the fuel gas to flow therethrough; an oxidizing gas flow passage including the cathode for allowing the oxidizing gas to flow therethrough, the method comprising the steps of; (a) stopping the flow of the fuel gas when the electric power is not generated and purging the fuel gas flow passage with a purging gas when a state of the fuel cell satisfies a predetermined condition; and (b) discharging the fuel gas from the fuel gas flow passage before the fuel gas flow passage is purged.

The method of operating a fuel cell system according to the seventh aspect may shorten a time interval for which single cells in the fuel cell are placed in a high voltage state by exhausting the fuel gas remaining in the anode before purging the anode to improve a durability of the fuel cell.

BRIEF DESCRIPTION OF THE DRAWINGS

The object and features of the present invention will become more readily apparent from the following detailed description taken in conjunction with the accompanying drawings in which:

FIG. 6 is a flowchart for showing a process upon the stop of the electric power generation according to a third embodiment;

FIG. 7 is a timing chart showing the process upon the stop of the electric power generation according to the third embodiment;

FIG. 8 is a flowchart for showing a process upon the stop of the electric power generation according to a fourth embodiment; and FIG. 9 is a timing chart showing the process upon the stop of the electric power generation according to the fourth embodiment.

The same or corresponding elements or parts are designated with like references throughout the drawings.

DETAILED DESCRIPTION OF THE INVENTION

Prior to describing an embodiment of the present invention, the above-mentioned related art will be further argued.

In the prior art fuel cell system disclosed in U.S. Patent Application Publication No. 2005/0271918 in which the anode is closed upon stop of the power generation in the fuel cell, the single cells forming the fuel cell may be under a high voltage for a relatively long time interval, which may cause deterioration of the fuel cell particularly, catalyst.

The present invention provides a fuel cell system and a method of operating the same capable of purging an anode to prevent deterioration in the fuel cell.

Figure 1:
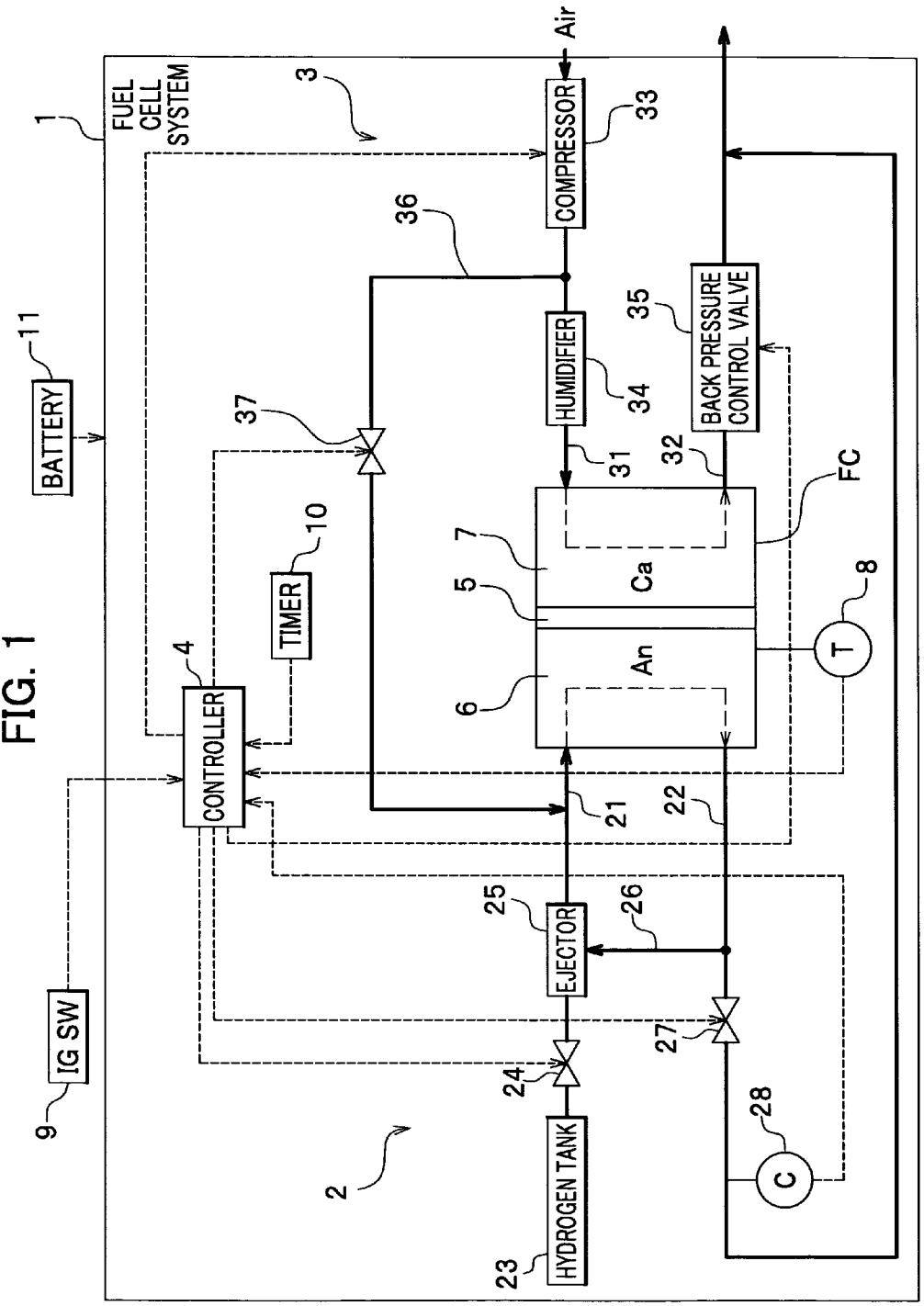
FIG. 1 is a block diagram of a fuel cell system according to the present invention.

FIG. 1 is a block diagram of the fuel cell system 1 according to the present invention.

As shown in FIG. 1, the fuel cell system 1 according to the present invention includes a fuel cell FC, an anode system 2, a cathode system 3, and a controller 4. In the embodiments in the present invention, a motor vehicle is exemplified, but the present invention is not limited thereto, i.e., the present invention is applicable to fuel cell systems for vehicles such as aircraft and ships and fixed type of fuel cell systems.

The fuel cell FC includes a plurality of single cells stacked in a thickness direction of each single cell. Each signal cell includes an MEA (Membrane Electrode Assembly) and a pair of electrically conductive separators (not shown) sandwiching the MEA, in which an electrolyte membrane 5 containing a solid polymer is sandwiched between an anode 6 containing a catalyst at one side of the electrolyte membrane 5 and a cathode 7 containing a catalyst at the other side of the electrolyte membrane 5. The fuel cell FC further includes flow passages (not shown) for allowing a coolant to flow therethrough. Provided near an outlet of the passages is a temperature sensor 8. Temperature information derived from the temperature sensor 8 corresponds to a system temperature (fuel cell temperature) T. The embodiment is not limited to this in detecting the system temperature. The system temperature T may be detected from other locations, members, and materials such as off-gases exhausted from the anode 6 and the cathode 7.

The anode system 2 supplies hydrogen as a fuel gas to the anode 6 of the fuel cell FC and exhaust the hydrogen from the anode 6, and includes an anode gas supply tube 21, an anode off-gas tube 22, a hydrogen tank 23, a hydrogen shutoff valve 24, an ejector 25, a circulation tube 26, a purge valve 27, and a hydrogen concentration sensor 28, and the like.

The anode gas supply tube 21 is connected to an inlet of the anode 6 of the fuel cell FC at one end and the hydrogen tank 23 at the other end.

The anode off-gas tube 22 is connected to an outlet of the anode 6 of the fuel cell FC at one end and a cathode off-gas tube 32 mentioned later at the other end.

The hydrogen tank 23 is charged with hydrogen having a high purity with a high pressure of 35 MPa (about 350 atmospheres). The hydrogen shutoff valve 24 is, for example, of an electromagnetic operation type and installed near a downstream location from the hydrogen tank 23.

The ejector 25 is one of types of vacuum pumps provided to return unreacted hydrogen exhausted from the anode 6 of the fuel cell FC again for circulation and is connected to one end of the circulation tube 26. The other end of the circulation tube 26 is connected to the anode off-gas tube 22 at a location upstream from the purge valve 27. Thus, circulation of the unreacted hydrogen exhausted from the fuel cell FC provides an efficient utilization of the hydrogen as fuel.

The purge valve 27 operates as an exhausting valve and includes a valve of which opening degree is desirably controlled to have a function for preventing a power generation characteristic from decreasing by, for example, periodically exhausting impurities such as nitrogen and water contained in the air accumulated at the anode 6 during the power generation. Further, a downstream side of the purge valve 27 is communicated with the outside air.

The hydrogen concentration sensor 28 is provided downstream from the purge valve 27 and has a function for detecting a hydrogen concentration of the anode off-gas exhausted from the anode 6 of the fuel cell FC.

In the embodiment, a fuel gas flow passage circuit includes flow passages provided by the anode gas supply tube 21, the anode off-gas tube 22, the circulation tube 26, and the anode 6.

The cathode system 3 is provided for supplying the air (oxygen) as an oxidizing gas to the cathode 7 of the fuel cell FC and exhausting the air (oxygen) and the like and includes a cathode gas supply tube 31, a cathode off-gas tube 32, a compressor 33, a humidifier 34, a back pressure control valve 35, an air introducing tube 36, and an air introducing valve 37. In the embodiment, the air as the oxidizing gas is used as a purging gas for purging the fuel gas flow passage.

The cathode gas supply tube 31 is connected at one end thereof to an inlet of the cathode 7 of the fuel cell FC. The cathode off-gas tube 32 is connected to an outlet of the cathode 7 of the fuel cell FC.

In the embodiment, an oxidizing gas flow passage circuit includes flow passages provided by the cathode gas supply tube 31, the cathode off-gas tube 32, and the cathode 7.

The compressor 33 is a super charger driven by a motor for taking in and compressing the air (outside air) to supply the compressed air to the cathode 7 of the fuel cell FC. The compressor 33 provides a purging function for purging the oxidizing gas flow passage circuit according to the embodiment. Further the air taken in by the compressor 33 is commonly used as a purging gas for purging the fuel gas passage circuit (exhausting the fuel gas) and the oxidizing gas flow circuit.

The humidifier 34 is provided halfway in the cathode gas supply tube 31 for humidifying the air supplied to the cathode 7 to have such a humidity as to cause the electrolyte membrane 5 to sufficiently exhibit an ion conductivity.

The back pressure control valve 35 is provided downstream from the fuel cell FC for adjusting a pressure within the cathode 7.

The air introducing tube 36 is connected at one end to the cathode gas supply tube 31 at a location upstream from the humidifier 34 and at the other end to the anode gas supply tube 21 for introducing the air as the purging gas into the anode system 2. In the embodiment, the air introducing tube 36 is used for purging the fuel gas flow circuit and exhausting the fuel gas.

Provided as the air introducing valve 37 is a shutoff valve installed in the air introducing tube 36. When the air introducing valve 37 is opened, the air taken in by the compressor 33 is supplied to the anode 6.

The controller 4 includes a CPU (Central Processing Unit), a memory, an input/output interface circuit, and various electric and electronic circuits (not shown) and is electrically connected to the temperature sensor 8, the hydrogen shutoff valve 24, the purge valve 27, the hydrogen concentration sensor 28, the compressor 33, the back pressure control valve 35, and the air introducing valve 37. Thus, the controller 4 is supplied with the system temperature information from the temperature sensor 8, the hydrogen concentration information of the temperature within the anode system 2 and controls open and close operations of the hydrogen shutoff valve 24, an open degree adjusting operation of the purge valve 27, a rotational speed of the compressor 33, and an opening degree of the back pressure control valve 35.

The controller 4 is further connected to an ignition switch (IGSW) 9, and a timer 10. The ignition switch 9 supplies a power generation stop signal to the controller 4 to stop the fuel cell system 1 (system stop) and a power generation start signal to the controller 4 to start the fuel cell system 1. The timer 10 measures time and supplies timer value to the controller 4. In addition, the fuel cell system 1 is supplied with an electric power from a battery 11.

First Embodiment

Figure 2:
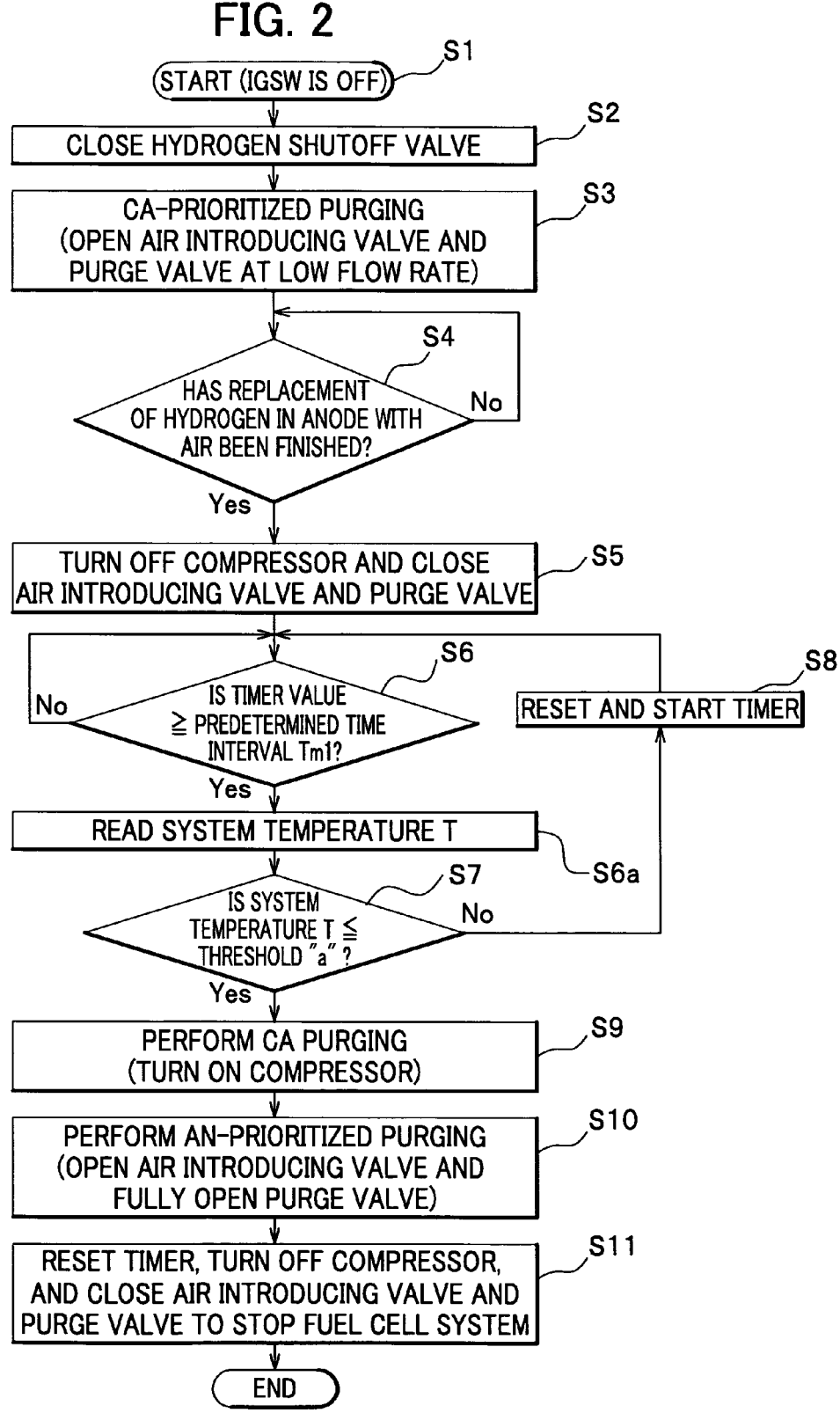
FIG. 2 is a flowchart for showing a process upon stop of electric power generation according to a first embodiment.
Figure 3:
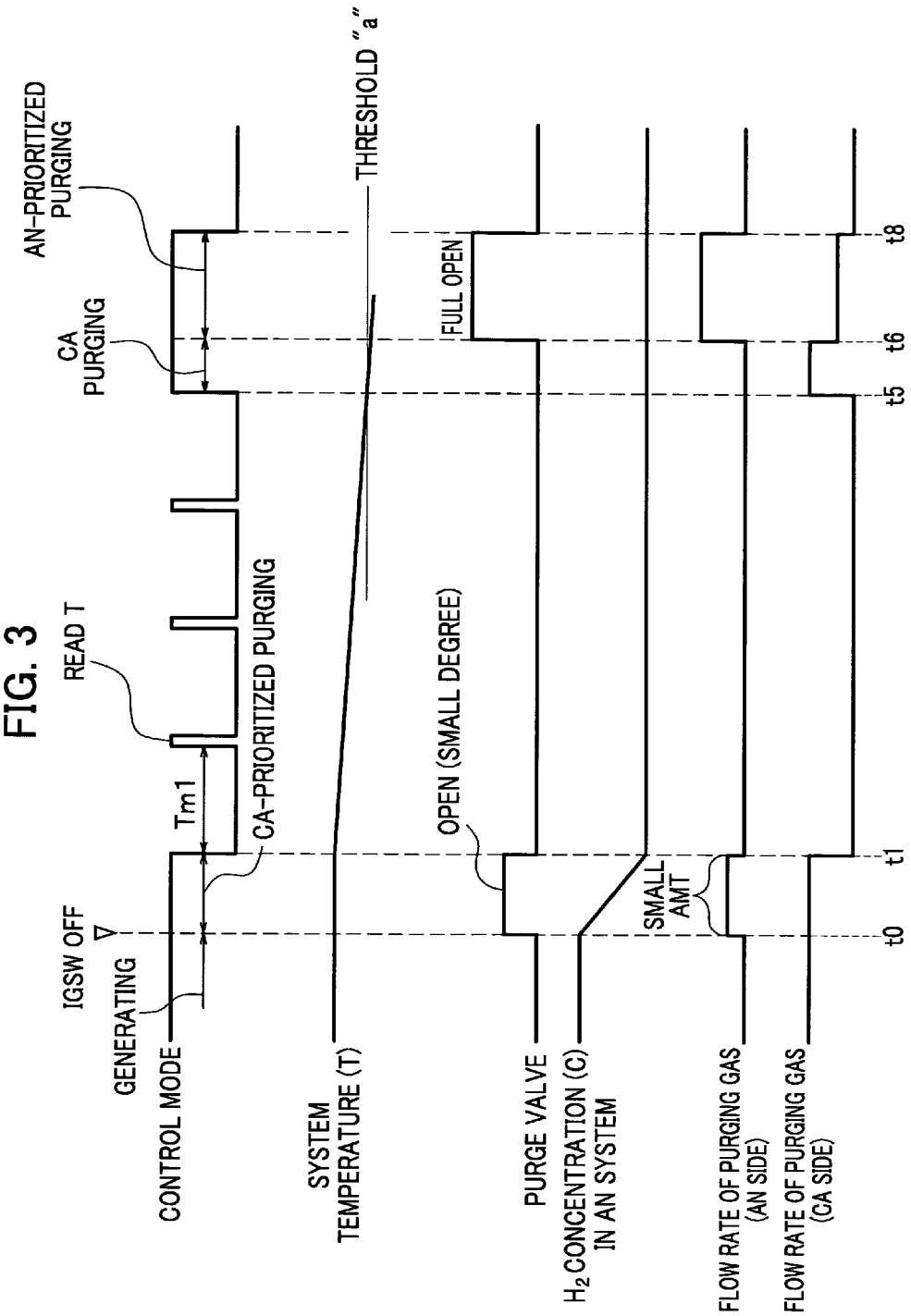
FIG. 3 is a timing chart showing an operation for replacing hydrogen in an anode with air just after the stop of the electric power generation.

Will be described a process according to a first embodiment upon the power generation stop with reference to FIGS. 2 and 3. FIG. 2 shows a flowchart according to the first embodiment upon the power generation stop, and FIG. 3 shows a timing chart for replacing the hydrogen in the anode with the air just after the power generation stop. In the first embodiment, the air introducing valve 37 and the purge valve 27 provide a fuel gas exhausting function in addition to the compressor 33.

As shown in FIG. 2, in a step S1, when the operator turns off the ignition switch (IGSW) 9 (time t0 in FIG. 3), the ignition switch 9 supplies the power generation stop signal to the controller 4 (see FIG. 1). The controller 4 receiving the power generation stop signal closes the hydrogen shutoff valve 24 to cut off the hydrogen (a step S2), so that the fuel gas flow passage including the anode 6 is tightly sealed. In the following step S3, the controller 4 allows the compressor 33 to continue the operation thereof and fully opens the back pressure control valve 35 to allow the air taken in by the compressor 33 to flow through the cathode gas supply tube 31, the cathode 7, and the cathode off-gas tube 32 to perform cathode purging. This operation exhausts water remaining in the cathode 7 at the power generation stop (turn off of the ignition switch 9) toward the outside air (outside the vehicle) through the cathode off-gas tube 32. In the step S3, the controller 4 opens the air introducing valve 37 and slightly opens the purge valve 27 to introduce the air taken in by the compressor 33 from the atmosphere introducing tube 36 to the anode 6. In this event, because an opening degree of the purge valve 27 is set to have a low flow rate to introduce a predetermined small amount of the air from the compressor 33 to the anode 6 to push out the hydrogen remaining in the anode 6 to perform the replacement process of the hydrogen. Because the replacement process is a kind of purging, the total process between time t0 and t1 is referred to as Ca-prioritized purge.

The hydrogen discharged from the anode 6 by the air is combined with a flow of the gas (the off-gas including the air, water, and the like) through the cathode off-gas tube 32 for dilution of the hydrogen, the combined flow of gas being exhausted to the atmosphere (outside air). The embodiment is not limited to the operation in which the exhausted hydrogen is mixed with the off-gas. For example, the hydrogen may be mixed with a dried air (gas) introduced upstream from the humidifier 34. Further, the small (predetermined) amount of the air means such an amount as to exhaust the hydrogen having a volume in the fuel gas flow passage including the anode 6, but not to exhaust the water remaining in the anode 6. In other words, the fuel gas flow passage circuit has a predetermined volume and the predetermined amount of the purging gas may be substantially identical with the volume. Thus, the hydrogen is exhausted from the anode 6 by introducing the small amount of the air into the anode 6. The exhausted hydrogen is combined with the off-gas (the air, water, and the like) exhausted from the cathode 7 to be exhaust from the anode 6 in a short time, resulting in further decrease in the hydrogen concentration.

The controller 4 judges and determines whether the replacement of the hydrogen in the anode 6 with the air (discharging the hydrogen from the anode 6) has been finished on the basis of the hydrogen concentration information obtained from the hydrogen concentration sensor 28 (a step S4). In the step S4, if it is determined that the replacement of the hydrogen with the air has not been finished (No), the process in the step S4 is repeated until the replacement with the air is finished. If it is determined that the replacement of the hydrogen with the air has been finished (Yes), the controller 4 proceeds to the step S5 and turns off the compressor 33 and closes the air introducing valve 37 and the purge valve 27 (time t1 in FIG. 3). In this event, the controller 4 resets and starts the timer 10. As mentioned above, the replacement of the hydrogen remaining in the anode 6 with the air immediately after the stop of the power generation shortens the time interval for which each single cell of the fuel cell FC under a high voltage state, resulting in an improvement in the durability of the fuel cell FC. In the step S4 for judging the completion of the replacement of the hydrogen with the air is not limited to this operation, but may be made on the basis of time previously obtained from experiments.

After the step S5 the controller 4 determines whether the predetermined time interval Tm1 (see FIG. 8) has elapsed (a step S6). If the predetermined time interval Tm1 has not elapsed (No), the controller 4 returns to the process in the step S6. If the predetermined time interval Tm1 has elapsed (Yes), the controller 4 reads the system temperature T from the temperature sensor 8 (step 6a). In the following step S7, the controller 4 determines whether the system temperature T from the temperature sensor 8 is equal to or lower than a threshold "a" (for example, 5° C.). The threshold "a" is used as a first predetermined condition. If the system temperature T is not equal to or not lower than the threshold "a" (No), the controller 4 proceeds to the step S8 and resets the timer 10 again and starts the timer 10. As mentioned above, the controller 4 monitors the system temperature T to detect that the system temperature T becomes equal to or lower than the threshold "a" periodically.

If the controller 4 determines that the system temperature T is equal to or lower than the threshold "a" (Yes, time t5 in FIG. 3), the controller 4 proceeds to a step S9 to perform purging for the cathode 7 (hereinafter referred to as Ca purging). In the Ca purging, the controller 4 turns on the compressor 33 to allow the air to flow through the cathode gas supply tube 31, the cathode 7, and the cathode off-gas tube 32 to exhaust dew water or the like generated due to decrease in the temperature there. A time interval (between time t5 and t6) of the Ca purging is determined on the basis of, for example, previously conducted experiments or the like. Further, the timing necessary for purging can be accurately determined on the basis of the determination of the first predetermined condition (the threshold "a") whether the system temperature T from the temperature sensor 8 is equal to or lower than the threshold "a" (for example, 5° C.). More specifically, the timing necessary for purging is determined when the number of drops of the dew water increases as the temperature decreases to a considerable extent.

Upon termination of the Ca purging, the controller 4 proceeds to a step S10 to perform purging for the anode (hereinafter referred to as an An-prioritized purging). In the An-prioritized purging, the controller 4 continues the operation of the compressor 33 and opens the air introducing valve 37 and opens the purge valve 27 at a large open degree (full open). Thus, the air taken in by the compressor 33 is introduced at a large flow rate from the air introducing tube 36 to the anode 6, so as to exhaust water remaining in the anode 6 together with the off-gas (water, the air, and the like) exhausted from the cathode 7 through the anode off-gas tube 22 toward the atmosphere (outside the vehicle). The time interval for performing the An-prioritized purging is also determined on the basis of time interval (between time t6 and time t8) previously obtained in experiments. After the time t8, the controller 4 in a step S11 turns off the compressor 33 and closes the air introducing valve 37 and the purge valve 27 to stop the fuel cell system 1.

Second Embodiment

Figure 4:
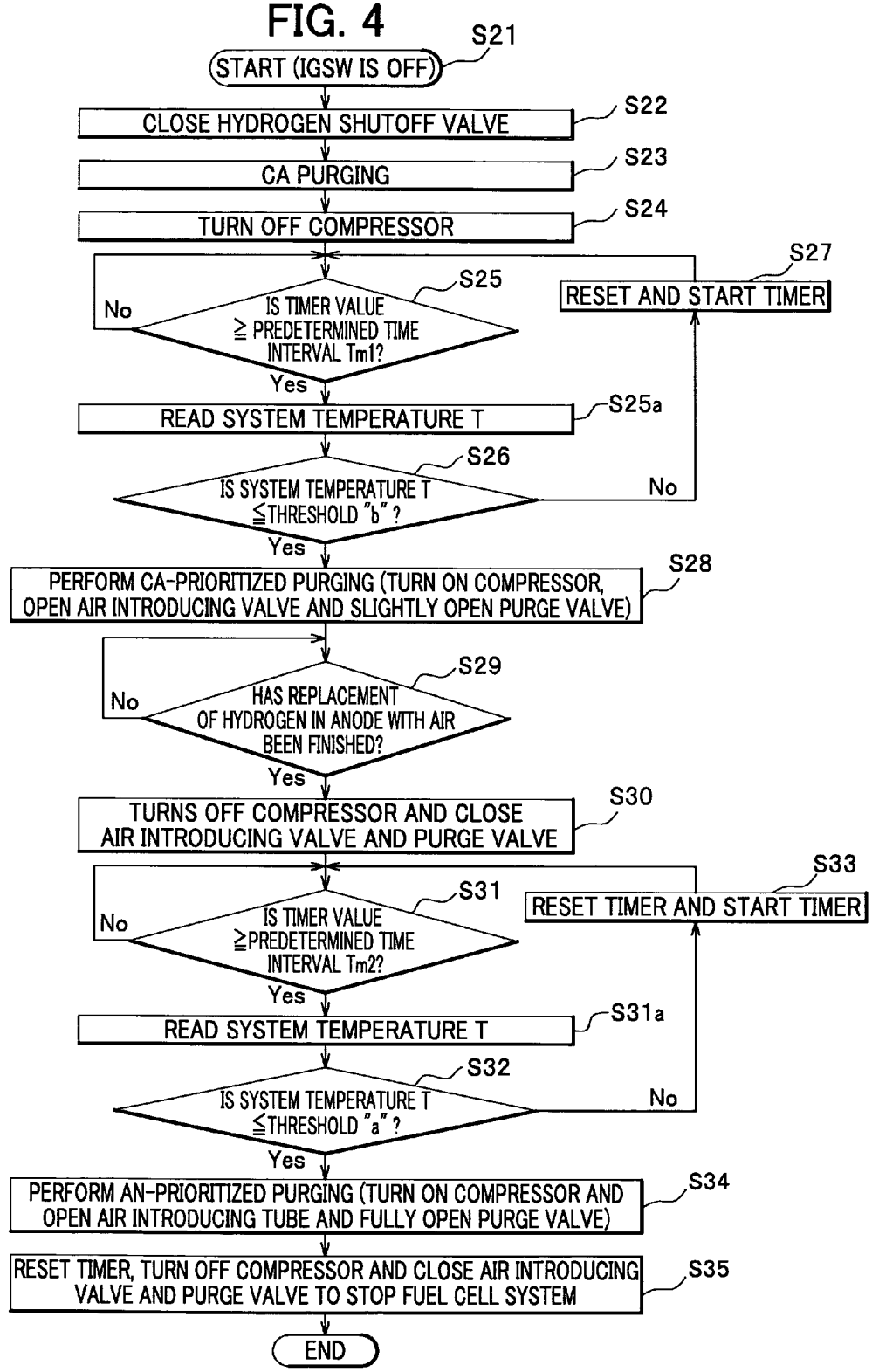
FIG. 4 is a flowchart for showing a process upon the stop of the electric power generation according to a second embodiment.
Figure 5:
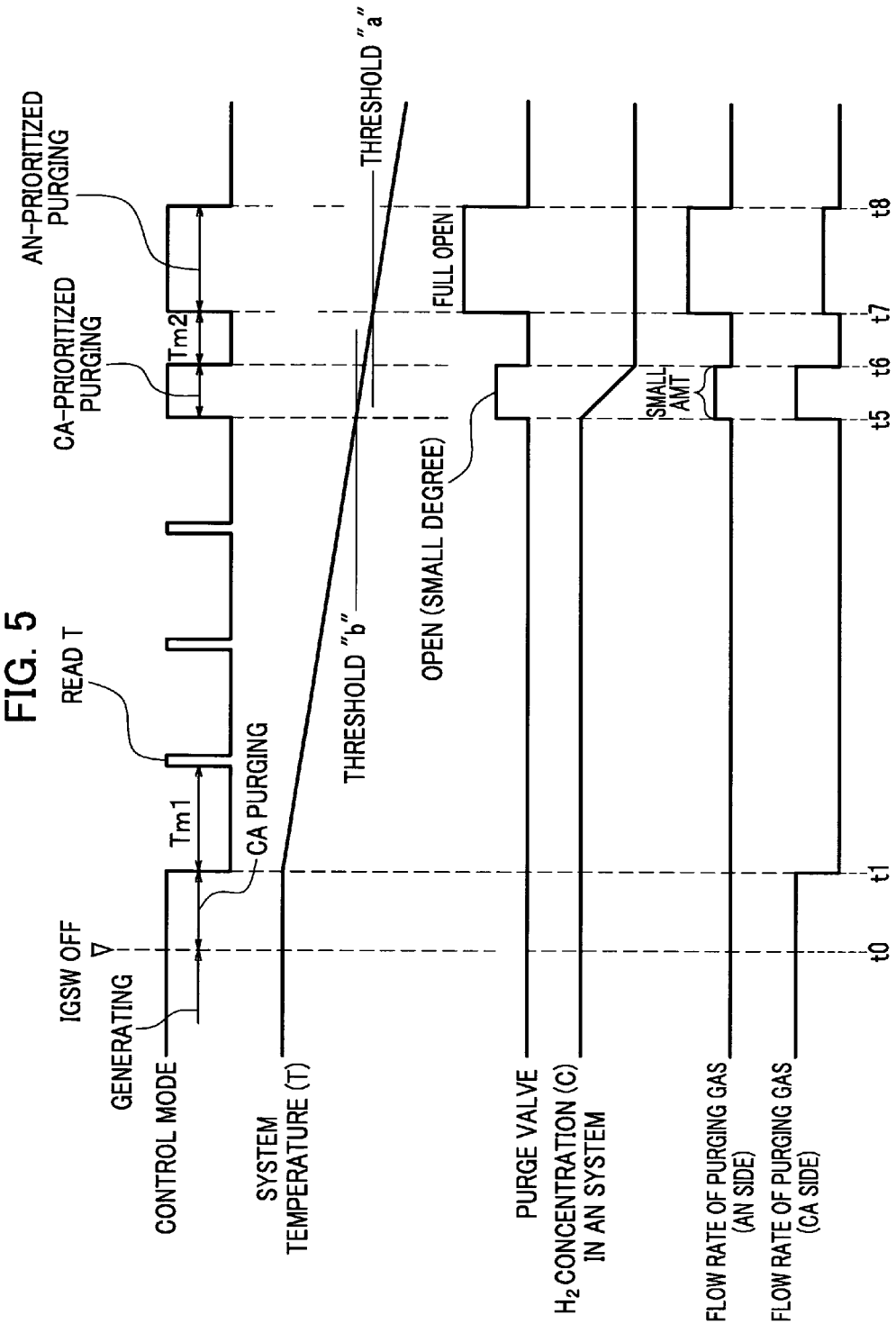
FIG. 5 is a timing chart for showing the process upon the stop of the electric power generation according to the second embodiment.

FIG. 4 shows a flowchart according to a second embodiment. FIG. 5 shows a timing chart of an operation for replacing the hydrogen in the anode 6 with the air during Ca-prioritized purging. In the second embodiment, fuel gas exhausting is provided by using the air introducing valve 37 and the purge valve 27.

As shown in FIG. 4, when the ignition switch 9 is turned off in a step S21 (time t0 in FIG. 5), the controller 4 closes the hydrogen shutoff valve 24 to stop supply of the hydrogen gas (a step S22), so that the fuel gas flow passage including the anode 6 is tightly closed. In the following step S23, the controller 4 continues the operation of the compressor 33 and fully opens the back pressure valve 35 to introduce the air taken in by the compressor 33 into the cathode 7 to perform the Ca purging. In the Ca purging, when a predetermined time interval (t0 to t1 in FIG. 5) has elapsed, the controller 4 turns off the compressor 33 (a step S24). In this event, the controller 4 resets and starts the timer 10.

The controller 4 proceeds to the step S25 and determines whether the predetermined time interval Tm1 has elapsed. If the predetermined time interval Tm1 has not elapsed (No), the controller 4 returns to the process in the step S25. If the predetermined time interval Tm1 has elapsed (Yes), the controller 4 reads the system temperature T (a step S25a) and proceeds to a step S26 to determine whether the system temperature T is equal to or lower than a threshold "b". The threshold "b" as a second predetermined condition is a temperature of, for example, 30° C., which is higher than the threshold "a". Thus, the second predetermined condition is satisfied earlier than the first predetermined condition after the stop of the power generation. In the step S26, when the system temperature T is not equal to or lower than the threshold "b", the controller 4 in a step S27 resets and starts the timer 10 again.

In the step S26, when the system temperature T is equal to or lower than the threshold "b", the controller 4 proceeds to a step S28 to perform the Ca-prioritized purging (time t5 to t6). In the Ca-prioritized purging, the controller 4 turns on the compressor 33, opens the air introducing valve 37, opens the purge valve 27 at a small opening degree to introduce the air taken in by the compressor 33 into the cathode 7 as well as introduce a small predetermined amount (a low flow rate) of the air into the anode 6 through the air introducing tube 36. Purging the cathode 7 with the air exhausts water remaining in the cathode 7 toward the atmosphere, and introducing the small predetermined amount of the air into the anode 6 exhausts the hydrogen in the anode 6 to be replaced with the air. Further, in the Ca-prioritized purging, after the hydrogen is exhausted by introducing the small amount of the air into the anode 6 to push out the hydrogen, the hydrogen is combined with the off-gas exhausted from the cathode 7 to be diluted, so that the hydrogen in the anode 6 can be exhausted and a hydrogen concentration can be reduced in a short time interval. After that, the controller 4 in a step S29 determines whether the replacement of the hydrogen in the anode 6 with the air has been finished on the basis of the hydrogen C information obtained from the hydrogen concentration sensor 28. In the step S29, if the controller determines that the replacement of the hydrogen in the anode 6 with the air has been finished (Yes), the controller 4 in a step S30 turns off the compressor 33, closes the air introducing valve 37, and closes the purge valve 27 (time t6). In this event, the controller 4 resets and starts the timer 10. The determination in the step S26 is not limited to the judgment made based on the temperature, but may be made based on a time interval.

As mentioned above, the second predetermined condition (threshold "b") which can be established before an Anode-prioritized purging (hereinafter referred to as An-prioritized purging) is added. This allows the hydrogen to be exhausted only when occasion demands. For example, if start up of the fuel cell system 1 just after (within a short time interval) the stop of the power generation occurs, the start up can be quicken by not exhausting the hydrogen in the anode 6 just after stop of the power generation with prevention of the hydrogen from uselessly being exhausted.

In the following step S31, the controller 4 determines whether the predetermined time interval Tm2 (see FIG. 5) has elapsed from the completion of the Ca-prioritized purging (time t6). In the step S31, if the controller 4 determines that the predetermined time interval Tm2 (see FIG. 5) has not elapsed (No), the controller 4 returns to the process in the step S31. If the controller 4 determines that the predetermined time interval Tm2 (see FIG. 5) has elapsed in the step S31 (Yes), the controller 4 in a step S31a reads the system temperature T and proceeds to a step S32 to determine whether the system temperature T is equal to or lower than the threshold "a". In the step S32, if the controller 4 determines that the system temperature T is not equal to or lower than the threshold "a", in a step S33 resets and starts the timer 10 again and returns to the process in the step S31. If determining that the system temperature T is equal to or lower than the threshold "a" (Yes), the controller 4 in a step S34 performs the An-prioritized purge for a predetermined time interval (time t7 to t8). A start condition of the An-prioritized purging is determined on the basis of the temperature (first predetermined condition), and thus the purging is made when the number of drops of the dew water increases as the temperature decreases to a considerable extent, so that timing requiring the purging can be accurately determined. In the An-prioritized purging, the controller 4 turns on the compressor 33, opens the air introducing valve 37, and opens the purge valve 27 at a large open degree (full open). This introduces the air taken in by the compressor 33 into the anode 6 through the air introducing tube 36 to exhaust remaining water in the anode 6 through the anode-off gas tube 22 together with the off-gas exhausted from the cathode 7 toward the atmosphere (outside the vehicle). After completion of the An-prioritized purging, the controller 4 in a step S35 resets the timer 10, turns off the compressor 33, closes the air introducing valve 37, and closes the purge valve 27 to stop the fuel system 1 (time t8).

As mentioned above, also in the second embodiment, a time interval for which the single cells in the fuel cell FC under a high voltage state can be shorten by exhausting the hydrogen remaining in the anode 6 before the An-prioritized purging is performed. This improves a durability of the fuel cell FC.

In the second embodiment, the predetermined time intervals are provided between the Ca-prioritized purge and the An-prioritized purge. However, the operation is not limited to this, but the predetermined time interval Tm2 may be zero (Tm2=0) to continuously perform the An-prioritized purge after the Ca-prioritized purge. Further in FIG. 5, the predetermined time interval Tm2 appears only once. However, this may be repeatedly occurs until the system temperature T reaches the threshold "a".

Third Embodiment

FIG. 6 is a flowchart for showing an operation upon the stop of the power generation. FIG. 7 shows a timing chart in a case that the hydrogen in the anode 6 by natural diffusion. In the third embodiment, the purge valve 27 is used as a fuel gas exhausting part.

As shown in FIG. 6, when the ignition switch 9 is turned off in a step S41 (time t0 in FIG. 7), the controller 4 closes the hydrogen shutoff valve 24 to stop supply of the hydrogen gas (a step S42), so that the fuel gas flow passage including the anode 6 is tightly closed. In the following step S43, the controller 4 continues the operation of the compressor 33 and fully opens the back pressure valve 35 to introduce the air taken in by the compressor 33 into the cathode 7 to perform the Ca purging. The Ca purging is performed by the controller 4 for a predetermined interval (t0 to t1 in FIG. 7) and thus the controller 4 turns off the compressor 33 when the predetermined time interval (t0 to t1 in FIG. 7) has elapsed (a step S44). In this event, the controller 4 resets and starts the timer 10.

After that, the controller 4 determines whether the predetermined time interval Tm1 has elapsed (a step S45). If the predetermined time interval Tm1 has elapsed (Yes), the controller 4 reads the system temperature T (a step S45a) and in a step S46 determines whether the system temperature T is equal to or lower than a threshold "b". In the step S46, if the system temperature T is not equal to or lower than the threshold "b" (No), the controller 4 in a step S47 resets and starts the timer 10 again to judge the elapsed time. In the step S46, if the system temperature T is equal to or lower than the threshold "b" (Yes), the controller 4 proceeds to a step S48 to open the purge valve 27 at a large opening degree (time t3). In this event, the controller 4 reads the hydrogen concentration information.

Opening only the purge valve 27 in such a degree exhausts the hydrogen in the anode 6 through the anode off-gas tube 22 by natural diffusion. Exhausting the hydrogen in the anode 6 by the natural diffusion simplifies the structure of the fuel cell system 1 and eliminates the necessity of additional energy because it is unnecessary to drive the compressor 33. In place of the condition in the step S46, the determination may be made in accordance with time elapsing after the turning off of the ignition switch 9.

After that the controller 4 proceeds to a step S49 to determine whether the replacement of the hydrogen in the anode 6 with the air has been finished. In the step S49, if the replacement of the hydrogen in the anode 6 with the air has not been finished (No), the controller 4 returns to the step S49 with reading the system temperature T. In the step S49, if the replacement of the hydrogen in the anode 6 with the air has been finished (Yes), the controller 4 proceeds to a step S50 to close the purge valve 27 (time t4). In this event, the controller 4 resets and starts the timer 10. The controller 4 proceeds to a step S51 to determine whether the predetermined time interval Tm1 has elapsed by checking the timer 10. If the predetermined time interval Tm1 has elapsed (Yes), the controller 4 reads the system temperature T (a step S51a) and proceeds to a step S52 to determine whether the system temperature T is equal to or lower than the threshold "a". In the step S52, when the system temperature T is not equal to or lower than the threshold "a" (No), the controller 4 in a step S53 resets and starts the timer 10. In the step S52, when the system temperature T is equal to or lower than the threshold "a" (Yes), the controller 4 in a step S54 turns on the compressor 33 to perform the Ca purging for a predetermined interval (time t5 to t6). After completion of the Ca purging the controller 4 in a step S55 continues the operation of the compressor 33 and opens the air introducing valve 37, open the purge valve 27 at the large degree (fully open) to continuously perform the An-prioritized purging for a predetermined time interval (time t6 to t8). After completion of the An-prioritized purging, the controller 4 proceeds to a step S56 to turn off the compressor 33, close the air introducing valve 37, and close the purge valve 27 to stop the fuel system 1 (time t8).

Fourth Embodiment

FIG. 8 shows a flowchart according to a fourth embodiment. FIG. 9 shows a timing chart for replacing the hydrogen in the anode 6 with the air by the natural diffusion just after the stop of the power generation. In the fourth embodiment, the purge valve 27 is used as a fuel gas exhausting part.

As shown in FIG. 8, when the ignition switch 9 is turned off in a step S61 (time t0 in FIG. 9), the controller 4 closes the hydrogen shutoff valve 24 to stop supply of the hydrogen gas (a step S62). In the following step S63, the controller 4 continues the operation of the compressor 33 and fully opens the back pressure valve 35 to introduce the air taken in by the compressor 33 into the cathode 7 to perform the Ca purging. After completion of the Ca purging, the controller 4 opens the purge valve 27 at a large opening degree (a step S64). Opening only the purge valve 27 in such a degree exhausts the hydrogen in the anode 6 through the anode off-gas tube 22 by the natural diffusion. Thus, exhausting the hydrogen in the anode 6 by the natural diffusion simplifies the structure of the fuel cell system 1 and eliminates the necessity of additional energy because it is unnecessary to drive the compressor 33. In the step S64 the controller 4 reads the hydrogen concentration information obtained from the hydrogen concentration sensor 28.

In a step S65, the controller 4 determines whether the replacement of the hydrogen in the anode 6 with the air has been finished. If the controller 4 does not determine that the replacement of the hydrogen in the anode 6 with the air has been finished (No), the controller 4 returns to the step S65 after reading the hydrogen concentration information. If the controller 4 determines that the replacement of the hydrogen in the anode 6 with the air has been finished (Yes), the controller 4 turns off the compressor 33 and closes the purge valve 27 (a step S66, time t2). In this event, the controller 4 resets and starts the timer 10. After that, the controller 4 determines whether the predetermined time interval Tm1 has elapsed by checking the timer value in the timer 10 (a step S67). If the predetermined time interval Tm1 has elapsed (Yes), the controller 4 reads the system temperature T (a step S67*a*) and proceeds to a step S68 to determine whether the system temperature T is equal to or lower than the threshold "a". In the step S68, if the system temperature T is not equal to or lower than the threshold "a" (No), the controller 4 in a step S69 resets and starts the timer 10. In the step S68, if the system temperature T is equal to or lower than the threshold "a" (Yes), the controller 4 in a step S70 turns on the compressor 33 to perform the Ca purging for a predetermined interval (time t5 to t6). After completion of the Ca purging the controller 4 proceeds to a step S71 to open the air introducing valve 37, open the purge valve 27 at the large degree (fully open) to perform the An-prioritized purging for a predetermined time interval (time t6 to t8) following to the Ca purging. After completion of the An-prioritized purging, the controller 4 proceeds to a step S72 to reset the timer 10, turn off the compressor 33, close the air introducing valve 37, and close the purge valve 27 to stop the fuel system 1.

As mentioned above, in the third and fourth embodiments, while the hydrogen is replaced with the air by the natural diffusion, the An-prioritized purging is efficiently performed because the purging operation is not perfumed for exhausting the remaining water in the anode 6, but is performed after dew water is sufficiently generated when the temperature sufficiently decreases.

According to the fuel cell system and the method of operating the same, the anode 6 can be purged without deterioration of the fuel cell.

The invention claimed is:

1. A fuel cell system comprising:
a fuel cell including an anode supplied with a fuel gas and a cathode supplied with an oxidizing gas for generating an electric power;
a fuel gas flow passage including the anode for allowing the fuel gas to flow therethrough;
an oxidizing gas flow passage including the cathode for allowing the oxidizing gas to flow therethrough;
an oxidizing gas introducing passage configured to introduce the oxidizing gas to the fuel gas flow passage;
a temperature sensor configured to obtain a temperature of the fuel cell;
a control part that, when the generation of the electric power is stopped, stops supply of the fuel gas to the fuel gas flow passage and conducts:
a replacement operation including:
purging the oxidizing gas flow passage with the oxidizing gas as well as introducing a predetermined quantity of oxidizing gas into the fuel gas flow passage through the oxidizing gas introducing passage and simultaneously discharging the fuel gas remaining in the fuel gas flow passage so as to replace the fuel gas remaining in the fuel gas flow passage with the oxidizing gas, a flow of the discharged fuel gas being combined with a flow of the gas from the oxidizing gas flow passage in a combining flow passage, the introduction of the oxidizing gas being stopped upon completion of the purging operation, and
a water exhausting operation after an interval from the replacement operation, only when the temperature of the fuel cell is equal to or smaller than a first predetermined temperature, the water exhausting operation including:
purging the fuel gas flow passage by re-introducing oxidizing gas to the fuel gas flow passage to exhaust water remaining in the fuel gas flow passage with the oxidizing gas.

2. The fuel cell as claimed in claim 1, wherein the control part repeats checking at the interval whether a state of the fuel cell satisfies the first predetermined condition and when the state of the fuel cell satisfies the first predetermined condition, the control part conducts the water exhausting operation and then successively stops the fuel cell system.

3. The fuel cell system as claimed in claim 1, wherein the fuel gas flow passage purging part comprises a valve through which the fuel gas flow passage is communicated with an outside air, the fuel gas flow passage purging part opening the valve to exhaust the fuel gas.

4. The fuel cell system as claimed in claim 1, wherein the fuel gas purging part purges the fuel gas in the fuel gas flow passage having a predetermined quantity of the purging gas immediately after the generation of the electric power is stopped.

5. The fuel cell system as claimed in claim 1, wherein the control part conducts the replacement operation when the temperature of the fuel cell is equal to or smaller than a second predetermined temperature which is higher than the first predetermined temperature.

6. The fuel cell system as claimed in claim 1, wherein a state of the fuel cell is a temperature of the fuel cell.

7. A method of operating a fuel cell system, the fuel cell system including: a fuel cell including an anode supplied with a fuel gas and a cathode supplied with an oxidizing gas for generating an electric power, a fuel gas flow passage including the anode for allowing the fuel gas to flow therethrough an oxidizing gas flow passage including the cathode for allowing the oxidizing gas to flow therethrough, the method comprising:
   performing a replacement operation that:
      purges the oxidizing gas flow passage with the oxidizing gas as well as introducing a predetermined quantity of oxidizing gas into the fuel gas flow passage through the oxidizing gas introducing passage and simultaneously discharging the fuel gas remaining in the fuel gas flow passage so as to replace the fuel gas remaining in the fuel gas flow passage with the oxidizing gas, a flow of the discharged fuel gas being combined with a flow of the gas from the oxidizing gas flow passage in a combining flow passage, the introduction of the oxidizing gas being stopped upon completion of the purging operation, and
   performing a water exhausting operation after an interval from the replacement operation, only when the temperature of the fuel cell is equal to or smaller than a first predetermined temperature, the water exhausting operation including:
      purging the fuel gas flow passage by re-introducing oxidizing gas to the fuel gas flow passage to exhaust water remaining in the fuel gas flow passage with the oxidizing gas.

8. The fuel cell system as claimed in claim 1, wherein the fuel gas flow passage has a predetermined volume and the predetermined quantity of the purging gas is substantially identical with the volume.

9. The method as claimed in claim 7, wherein the fuel gas flow passage has a predetermined volume, and the fuel gas is purged during the replacement operation with a predetermined amount of the oxidizing gas, the predetermined amount of the oxidizing gas being substantially identical with the volume of the fuel gas flow passage.

* * * * *